United States Patent Office.

MAURICE L'EPINE, OF PARIS, FRANCE, ASSIGNOR TO THE FIRM SOCIÉTÉ DE LAMINAGE DU NICKEL, OF SAME PLACE.

MODE OF FORMING COMPOUND PLATES OF NICKEL AND SILVER OR PLATINUM.

SPECIFICATION forming part of Letters Patent No. 340,223, dated April 20, 1886.

Application filed February 19, 1886. Serial No. 192,575. (No specimens.)

*To all whom it may concern:*

Be it known that I, MAURICE L'EPINE, a citizen of the Republic of France, residing at Paris, in the said Republic, have invented a new and useful Improvement in the Art of Manufacturing Compound Metal Plates and Wires, of which the following is a specification.

This invention relates to the union by fusion or soldering of platinum or silver and their alloys with nickle and its alloys.

The invention is performed in the following manner: The metals to be united may be in the form of plates or wires. For the purpose of rendering as clean as possible the surfaces to be fused or soldered together, the said surfaces are cleaned by scouring or pickling, to facilitate their perfect contact in all points. The nickel should, moreover, be in such condition of malleability that the hammering or rolling which terminates the union may complete the intimate union of the metals in all parts. The surfaces to be fused or soldered together are sprinkled with any suitable flux—such as borax—and the two pieces are afterward subjected to a suitable temperature for the soldering and afterward subjected to the hammering or rolling.

In order to succeed in the soldering it is necessary to protect the faces to be soldered from contact with the air, which oxidizes nickel at a red heat. For this purpose, before heating the metals to be united, I envelop them in thin plates of sheet-iron. When, after the heating and the hammering or rolling, the metals are united, the sheet-iron forming the protective envelope is removed by any convenient means.

In order to prevent the soldering of the sheet-iron envelope to the metals to be united, I coat the interior of the said envelope with magnesia, lime, oxide of zinc, or any other refractory substance in order to prevent the contact of the said envelope with the metals to be united. This coating will insure the easy removal of the envelope after the plating has been completed. Compound metal plates obtained in this manner are suitable for the manufacture of such receivers, vessels, and utensils as are used in pharmaceutical, chemical, and other processes.

What I claim as my invention, and desire to secure by Letters Patent, is—

The within-described improvement in the art of manufacturing compound plates or wires composed of a plate or wire of nickel or one of its alloys, and a plate or wire of silver or platinum or one of their alloys, said improvement consisting in enveloping the plates or wires to be united by fusion or soldering in an envelope of sheet metal having an interior coating of lime, magnesia, or similar refractory substance, and while thus enveloped subjecting them to the heat necessary to fuse or solder them together and the hammering or rolling necessary to complete their union, substantially as herein set forth.

In testimony whereof I have signed this specification in the presence of two subscribing witnesses.

MAURICE L'EPINE.

Witnesses:
 CH. CRÉMERS,
 ROBT. M. HOOPER,